Dec. 4, 1951  B. J. LEACH  2,577,338
BALE HOIST
Filed April 29, 1946  2 SHEETS—SHEET 1
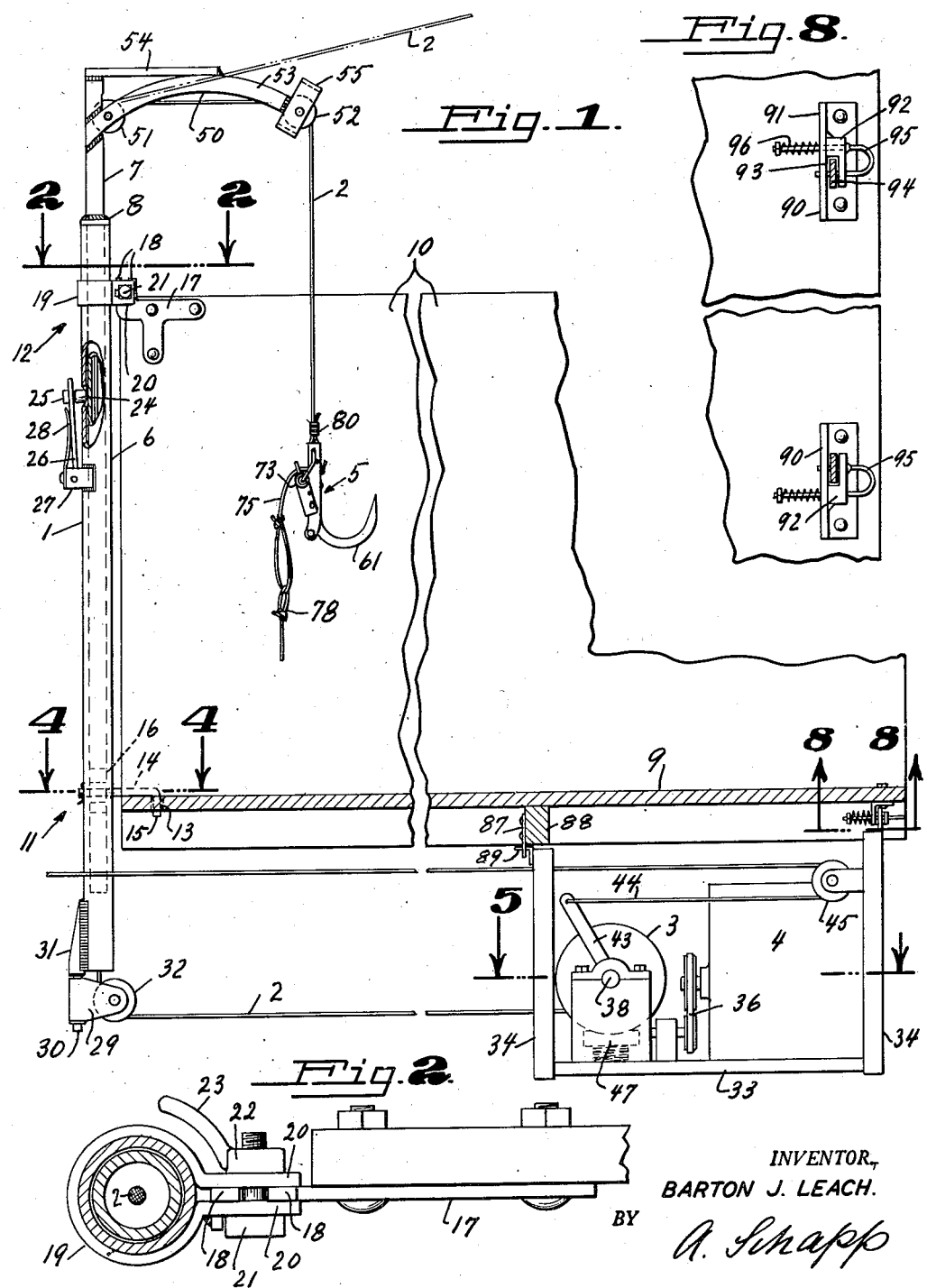
INVENTOR,
BARTON J. LEACH.
BY
A. Schapp
ATTORNEY.

Dec. 4, 1951 B. J. LEACH 2,577,338
BALE HOIST
Filed April 29, 1946 2 SHEETS—SHEET 2
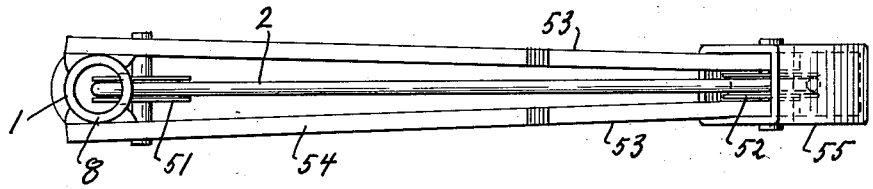
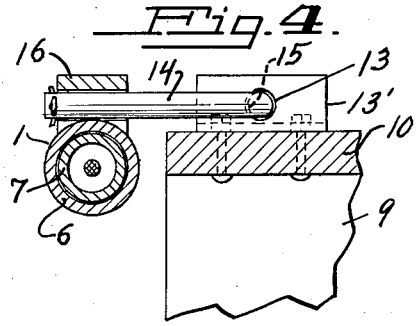
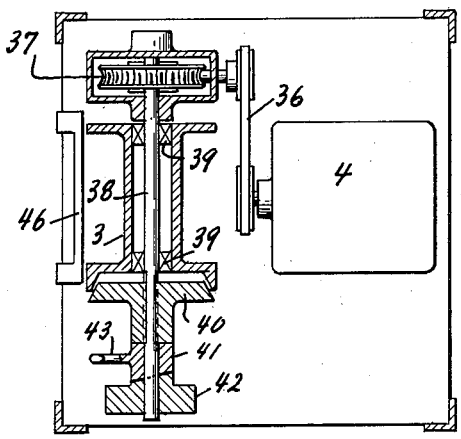
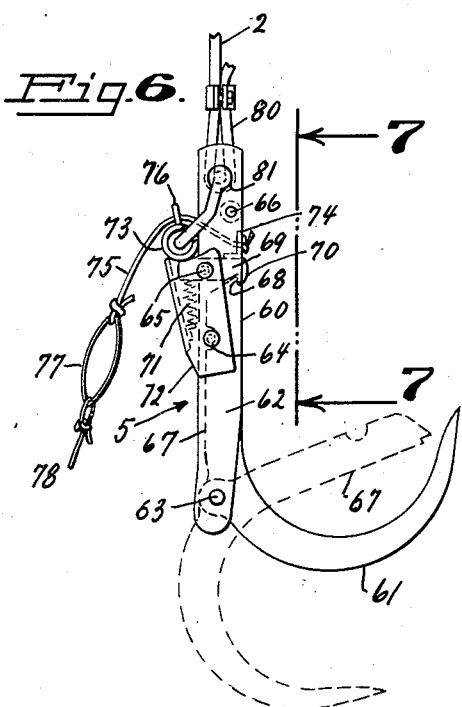
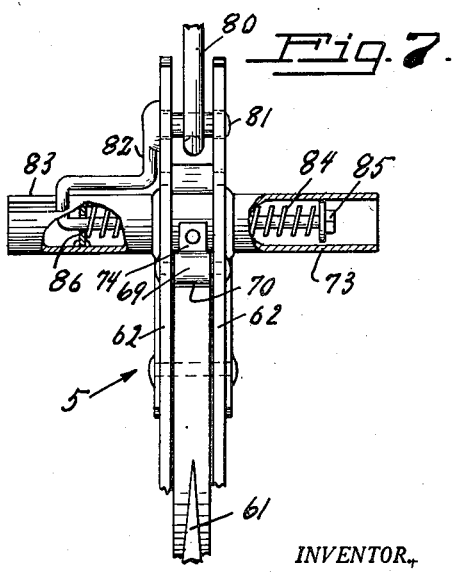
INVENTOR.
BARTON J. LEACH
BY
A. Schapp
ATTORNEY.

Patented Dec. 4, 1951

2,577,338

UNITED STATES PATENT OFFICE 2,577,338

BALE HOIST

Barton J. Leach, Sutter County, Calif.

Application April 29, 1946, Serial No. 665,743

4 Claims. (Cl. 212—64)

The present invention relates to improvements in bale hoists, and its particular object is to provide a machine for facilitating the work of loading bales of hay or straw or similar articles on a vehicle, or generally to facilitate the transferring of bales from one location to another.

More particularly, it is proposed to provide a bale hoist which may be readily attached to and detached from a suitable vehicle, may be readily transferred from one vehicle to another, and which may be mounted on a stationary support, if desired.

Bales of hay or straw are usually loaded on a truck or other vehicle in several tiers, and it is a further object of the present invention to provide a bale hoist that can be readily adjusted in height for building up several tiers of bales on a single bed.

It is further proposed to provide a power plant that can be conveniently arranged underneath the bed of the vehicle so as to leave the entire bed free for loading purposes, with a clutch control operable from a remote point.

When hay or straw is baled in the field, the bales are usually dropped by the baling machine at spaced points, and the vehicle has to travel from point to point, while workmen walk or travel along, lifting the individual bales on the bed of the vehicle and arranging the bales on the vehicle in regular formation.

In the present invention it is proposed to provide a hoisting mechanism which will allow a single person, remaining on the bed of the vehicle at all times, to pick up the bales, and to arrange the bales on the bed while the vehicle proceeds to the next bale.

For this purpose, I have developed a special bale hook balanced and shaped in such a manner that an operator standing on the bed of the vehicle and holding the cable from which the hook is suspended, can easily engage the hook into the end of the bale, while subsequent pull exerted by the hoisting means causes the engagement to deepen for hoisting purposes.

And finally, it is proposed to provide a bale hoist, normally intended for picking bales from the field and for loading the same upon the platform of a vehicle, but which may be readily converted for other purposes, such as transferring the bales from a vehicle bed to a stack or into a barn, re-transferring from the barn to the vehicle bed, and picking up bales of hay from considerable distances, where it is impossible for the vehicle to get close to the bale.

Further advantages and objects of my invention will appear as the specification proceeds, and the novel and special features of the same will be fully defined in the claims attached hereto.

The preferred form of my invention is illustrated in the accompanying drawing, forming part of this application, in which:

Figure 1 shows a rear view of my bale hoist, the vehicle bed being shown in section;

Figure 2, a horizontal section taken along line 2—2 of Figure 1;

Figure 3, a top plan view of my bale hoist;

Figure 4, a section taken along line 4—4 of Figure 1;

Figure 5, a section taken along line 5—5 of Figure 1;

Figure 6, a detail view in side elevation of a hook used in my bale hoist;

Figure 7, a fragmentary front view of the hook as viewed from line 7—7 of Figure 6; and Figure 8, a fragmentary section taken along line 8—8 of Figure 1.

While I have shown only the preferred form of my invention, I wish to have it understood that various changes or modifications may be made within the scope of the claims attached hereto, without departing from the spirit of the invention.

Referring to the drawing in detail, my bale hoist comprises in its principal features, a standard 1 for guiding the cable 2, a winch 3 for operating the cable, a power plant for the winch, indicated at 4, and a hook 5 suspended from the free end of the cable.

The standard 1 is preferably made in two sections, the main section 6 and an extension 7 telescoped into the main section with freedom of sliding and revolving motion, the extension being supported in its lowermost position by means of a collar 8 fixed on the extension and riding on top of the main section.

The standard is intended particularly for attachment to a vehicle bed 9 having a front member 10 rising therefrom. The standard, as shown, is secured alongside of the front section of the bed, near the front left corner thereof.

The standard is secured with respect to the vehicle bed at two points, indicated at 11 and 12, spaced vertically from one another. At the lower point, the vehicle bed is formed with a suitable bearing 13, in an angle iron 13' secured upon the front member 10 (see Figure 4), and the standard has an arm 14 projecting laterally therefrom, the arm terminating in a vertical pin 15, adapted to be received in the bearing.

The arm 14 is revolvable in a bracket 16 on the standard, so that the pin 15 may be engaged in the bearing 13, while the standard is conveniently held in horizontal or angular position.

At the upper point 12, the front member 10 of the vehicle has a bracket 17 secured thereto and this bracket terminates in two spaced lips 18. A ring 19 is slidable on the standard, and is split to present two parallel flanges 20 adapted to straddle the two lips 18, and to be tightened upon the same by means of a bolt 21 extending through the flanges and between the lips and having a nut 22 operable by a suitable handle 23.

When the nut 22 is tightened, it not only clamps the flanges upon the lips, but also clamps the ring upon the standard. The standard may thus be easily secured to the vehicle bed by first introducing the pin 15 into the bearing 13, with the standard held in any desired angular position, then swinging the standard into vertical position, lowering the ring 19 for engagement with the bracket 17, and tightening the nut 22.

The upper section 7 of the standard is hollow like the lower section, and normally rides on the collar 8. It may be manually lifted to a higher position, and may be locked in that position by means of a roller 24 on a pin 25 projecting from an arm 26 pivoted to a bracket 27 secured upon the lower standard section. A spring 28 tends to urge the roller inwardly, through a hole in the lower section, so as to normally bear against the face of the upper section 7.

As the upper section 7 is raised to a point above the roller 24, the latter snaps into place underneath the section 7 and holds this section in raised position. The length of the roller is such as to only engage under the rim of the upper section, so as to leave the opening in the upper section clear for the cable.

The lower end of the standard 1 projects below the bed 9 of the vehicle and carries a bracket 29 swingable on a pivot 30 secured upon the bottom end of the standard, as at 31, the bracket having a pulley 32 positioned for guiding the cable 2 centrally into the standard.

One end of the cable 2 is wound or reeled upon the winch 3 mounted upon a platform 33 suspended from the bed 9 of the vehicle by means of suitable brackets 34, the platform 33 being preferably positioned at the right side of the vehicle bed, so as to leave considerable space between the winch 3 and the pulley 32.

The winch 3 should be dimensioned to carry a considerable length of cable for the purposes hereinafter set forth. It is operated by the power plant, indicated at 4, which may be of any suitable type.

For the purposes of my invention, I have found that a two and three-quarter horse power air-cooled gasoline engine is preferable. Power is transmitted from the engine to the winch through a V-belt drive indicated at 36, and a reduction gearing including a worm gear 37 on the shaft 38, on which the winch 3 is mounted through bearings 39, with freedom of revolving motion.

A clutch mechanism of any suitable type may be used for establishing driving relation between the shaft and the winch. The mechanism is here shown as a cone clutch 40 operable by a cam 41 bearing against a collar 42 fitted on the shaft 38.

The cam 41 has a handle 43 projecting radially therefrom and a cord 44 is connected to the end of the handle 43 and guided over a suitably disposed pulley 45 for remote control, preferably by the driver of the vehicle. A back-lash guard 46 is preferably arranged adjacent the winch to guide the cable, and a suitable brake mechanism 47 is used in connection with the winch to offer a certain amount of resistance to turning movement.

The upper end of the extension member 7 of the standard has a lateral arm 50 projecting therefrom and pulleys 51 and 52 at the base and the free end of the arm for guiding the cable 2. The pulley 51 is disposed in such a manner as to center the cable with respect to the extension 7, and the pulley 52 at the free end is intended to guide the cable downward, as shown in Figure 1.

The arm 50 is preferably made in the form of two spaced plates 53 reinforced by braces 54 extending from the standard section 7. The front ends of the plates are braced by a cage 55, which is sufficiently large to provide space above the pulley for withdrawal of the cable and its end loop.

This construction makes it convenient for the operator to pull the end of the cable through the cage 55 and to train the cable directly from pulley 51 over a remote pulley which may be supported in a barn or over a place where a stack of bales is to be erected. The general direction of the cable in this secondary position is shown in dotted lines.

The hook 5 is suspended from the free end of the cable and has been particularly developed with a view of enabling an operator to engage the hook into the bale without leaving the vehicle bed. In its general features the hook may be described as being fairly heavy in weight, well balanced to substantially retain the position shown in Figure 6 when freely suspended, and to comprise a straight shank 60 and a substantially semi-circular claw 61 extending laterally from the bottom end of the shank when in active position.

The claw 61 tapers from its base to its point for easy pentration into the bale of hay or other material. When the bale lies on the ground surface and the operator stands on the vehicle bed, the latter is able, due to the weight of the hook, its balance and shape, and due to the stiffness of the cable, to guide the hook into the bale material, preferably at the end of the bale, to a sufficient depth to cause upward pull, in the direction of the bale to deepen and complete the engagement, to turn the bale on the opposite end and to lift the bale on continuation of the pull.

The remaining detail features of the hook are directed to a release arrangement and a coupling arrangement.

To effect a quick release, the shank 60 is made of two spaced and parallel bars 62 held in spaced relation by spacing members 63, 64, 65 and 66. The spacing member 63 is disposed at the bottom end of the shank 60 and serves to give pivotal support to the claw 61, which has an arm or extension 67 extending straight upwardly between the bars 62 when the claw is in active position, as shown in full lines in Figure 6. The rearward swing of the arm is limited by the spacing member 64, the arm being notched at that point to receive the spacing member.

The upper end of the arm 67 is notched in its front face to form a nose 68, and a horizontal latch 69 pivoted on the spacing member 65 is formed with a corresponding nose 70 for locking the arm in active position, the latch being held in engagement with the arm by a spring 71 mounted upon the rear of the shank. A shield 72 secured upon opposite sides of the shank and surrounding the spring 71 protects the hands of the operator.

A tube 73 is mounted transversely upon the rear of the shank above the shield and at an elevation somewhat higher than the latch, and the latter has a small bracket 74 mounted upon the front end to serve as an attaching means for a cord 75 which is guided over the tube 73, being held in position by an eye 76 secured upon the top of the tube centrally of the bars 62. The outer end of the cord terminates in a loop 77. Thus, when the loop is pulled toward the rear, the latch is released and the claw is allowed to drop into the dotted-line position for releasing the bale. A second cord 78 may be secured to the loop for remote control. The releasing movement of the latch 69 is limited by the spacing member 66.

The loose end of the cable is formed into a permanent loop 80 and to allow of quick attachment of the hook to the loop, I provide a retractable pin 81 in the upper end of the shank. This pin has an arm 82 bent for convenient handling and terminating in a straight extension receivable in the tube 73, which is slotted for this purpose, as at 83.

The extension has a spring 84 surrounding the same, the spring being mounted between a cap 85 on the end of the extension and a fixed abutment 86 within the tube. The spring tends to hold the pin 81 in place, but will yield to manual pressure for withdrawing the pin to release the loop 80.

In use, assuming that a motor truck is used for field operations, a crew of one man and a boy capable of driving the truck is sufficient. The truck is drawn up alongside of each individual bale. To set the bale hook, the loader simply grasps the cable well above the hook, and, while standing on the vehicle bed, sets the point of the bale hook with a short swing into the end of the bale. The driver then operates the clutch from his seat, and, as the cable reels in, the bale hook sinks its point deeper into the end of the bale, and the bale is hoisted to the load.

As the bale comes upward and alongside of the load to a point where it clears the level of the load, the loader hooks it with a hand hook, and swings it over the load, whereupon the driver releases the clutch cord. While the loader positions the bale on the bed, the driver moves the vehicle to the next bale, and the procedure is repeated.

If a stray bale has been dropped by the baler in a location difficult to reach with a partly loaded vehicle because of rough ground, seepage water, ditch or other reasons, the driver may step down from the seat or cab, take the bale hook in hand, proceed to the stray bale and set the hook by hand, then return to his seat, pull the clutch control cord and proceed to drag in the stray bale and hoist it to the load as usual. Since the cable winch must be of ample capacity for unloading in a high storage barn or warehouses, there is enough cable available to reach a considerable distance for a stray bale.

The load is started with the standard in the lower or road position. As the loading proceeds, the standard is extended to its full height, by the loader, and is held at full height by the automatic extension lock. When the load has been completed, the driver releases the extension lock, and the standard is again lowered to the road position.

Unloading at the storage barn or warehouse is conducted in a somewhat similar manner. The bale hook is detached from the cable, the cable drawn back through the cage 55 and extended directly from the sheave 51 between the two side plates of the arm 50, over a remote or secondary pulley suspended from the roof structure of the barn, and back to the load.

The bale hook is then again attached to the cable and the extension cord or rope 78 is attached to the trip cord 75. The boy then takes the position on the load and the man the position on the bale pile in the barn or warehouse.

In the unloading process, the bale hook is set by hand and the boy operates the clutch through rope 44 and the trip cord 78. As the bale swings near the desired location on the pile the boy trips the bale hook by means of the trip rope and the bale drops to the pile.

While the man arranges the bales in order on the pile, the boy pulls the bale hook back to the load by means of the trip cord, closes the bale hook, resets it on another bale, and the same process is repeated.

Reloading bale-hauling vehicles from the storage pile is accomplished in a similar manner except that in this case the secondary pulley is suspended over the vehicle. In this operation, the boy takes the position on the pile to set the bale hook, and the man receives the bales on the vehicle being loaded.

It will thus be seen that my hoist speeds up bale handling jobs, reduces labor requirements to a minimum, and is extremely efficient in hauling from the fields, in unloading and reloading. It carries its own power plant, with a quiet V-belt drive, reduction gearing and ample power.

The hoist is quickly and easily attached and detached, balanced for remote control in field operations, and the tripping device is easily operated, and the hoist is efficient in retrieving stray bales in the field.

The cable drum is provided with a back lash guard and a recoil brake. The standard arm is clear for free cable action, may be set for two different elevations, has an automatic extension lock, and maximum distance is provided between the lower sheave and the winch to eliminate the cable bunching on the winch.

To facilitate installing and removal of the power and winch unit underneath the vehicle bed, I provide special fastening means obviating the use of any tools for the operation.

A pair of brackets 87 are supported from one of the joists 88 supporting the bed and are slotted to slidably receive tongues 89 projecting from the inner frame members 34. Near the outer edge of the vehicle bed I provide two similarly placed angle irons 90 secured to the underside of the bed and having downwardly projecting flanges 91.

A short bracket 92 secured upon each flange cooperates with the same in forming a slot 93 adapted to receive a tongue 94 rising from each of the outer frame members 34. A U-shaped latch member 95 has a free leg extending through registering perforations in the flange 91, the bracket 92 and the tongue 94 for supporting the outer frame member 34, while the other leg is acted on by a spring 96 for holding the first leg in operative position.

For removal of the unit, the operator merely retracts the two latch members 95, thereby releasing the tongues 94; and then releases the inner tongues 89 by pulling the entire unit outward.

For installing the unit, the operator first engages the tongues 89 with the brackets 87, then lifts or swings the outer section of the unit to bring the outer tongues into registry with the flanges 91 and the brackets 92, while retracting the latch members 95. After registry has been effected, the latch members are allowed to snap back into place.

I claim:

1. In combination, a vehicle bed having a bearing and a bracket supported above the bearing, a standard having an arm projecting at a right angle near the lower end thereof, a pin projecting from the arm and receivable in the bearing, the standard being rotatable on the arm so as to be swingable into vertical position after the pin has been positioned in the bearing, and detachable means for securing an upper portion of the standard to the bracket.

2. In combination, a vehicle bed having a bearing and a bracket with two spaced lips above the bearing, a standard having means near its lower end receivable in the bearing, a split ring slidable on the standard along an upper portion thereof and having two spaced flanges engageable over the lips, a bolt carried by the flanges and engageable between the lips, and a nut on the bolt operable for tightening the flanges upon the lips and the ring upon the standard.

3. In combination, a vehicle bed, a hollow standard, means for supporting the standard in vertical position alongside of the vehicle bed, an extension standard slidable and revolvable in the first standard, means for supporting the extension standard in a lowermost position in the first standard, a pin extending through the wall of the first standard at an elevation above the base of the extension standard when the latter occupies its lowermost position, supporting means for the pin mounted upon the outside of the first standard and including means urging the pin inwardly whereby the pin is made to project into supporting position below the extension standard when the latter is lifted manually to clear the pin.

4. In combination, a vehicle bed, a hollow standard, means for supporting the standard in vertical position alongside of the vehicle bed, an extension standard slidable and revolvable in the first standard, means for supporting the extension standard in a lowermost position in the first standard, a pin extending through the wall of the first standard at an elevation above the base of the extension standard when the latter occupies its lowermost position, supporting means for the pin mounted upon the outside of the first standard and including means urging the pin inwardly whereby the pin is made to project into supporting position below the extension standard when the latter is lifted manually to clear the pin, the pin having a roller engageable under the base of the extension standard and dimensioned for leaving the standard opening clear for passing a cable therethrough.

BARTON J. LEACH.

REFERENCES CITED

The following references are of record in the file of this patent:

UNITED STATES PATENTS

| Number | Name | Date |
| --- | --- | --- |
| 63,382 | Hall et al. | Apr. 2, 1867 |
| 261,749 | Morris | July 25, 1882 |
| 773,867 | Heywood | Nov. 1, 1904 |
| 817,350 | Twomey | Apr. 10, 1906 |
| 859,146 | Stewart | July 2, 1907 |
| 905,576 | Porter | Dec. 1, 1908 |
| 962,380 | McMahan | June 21, 1910 |
| 975,660 | Waggoner et al. | Nov. 15, 1910 |
| 1,008,024 | Gaertner | Nov. 7, 1911 |
| 1,175,049 | Cull | Mar. 14, 1916 |
| 1,276,584 | Shephard | Aug. 20, 1918 |
| 1,291,746 | Bradney et al. | Jan. 21, 1919 |
| 1,296,615 | Bly | Mar. 11, 1919 |
| 2,082,017 | McClain | June 1, 1937 |
| 2,140,132 | Hollett | Dec. 13, 1938 |
| 2,341,876 | Masterson | Feb. 15, 1944 |